(12) United States Patent
Broussard (10) Patent No.: US 7,496,615 B2
(45) Date of Patent: Feb. 24, 2009

(54) METHOD, SYSTEM AND ARTICLE FOR DETECTING CRITICAL MEMORY LEAKS CAUSING OUT-OF-MEMORY ERRORS IN JAVA SOFTWARE

(75) Inventor: Scott J. Broussard, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/798,910

(22) Filed: Mar. 11, 2004

(65) Prior Publication Data

US 2005/0204341 A1 Sep. 15, 2005

(51) Int. Cl.
*G06F 17/30* (2006.01)
(52) U.S. Cl. .................. 707/206; 717/151; 717/170; 717/124; 707/103 R; 707/205
(58) Field of Classification Search .................. None
See application file for complete search history.

(56) References Cited

U.S. PATENT DOCUMENTS 5,689,707 A * 11/1997 Donnelly .................. 707/206
5,764,883 A * 6/1998 Satterfield et al. ............. 714/38
5,842,019 A * 11/1998 Kolawa et al. ............... 717/130
6,167,535 A * 12/2000 Foote et al. .................. 714/38
6,370,684 B1 * 4/2002 De Pauw et al. ............ 717/124
2005/0204342 A1 * 9/2005 Broussard ................... 717/124

* cited by examiner

*Primary Examiner*—Cam Y Truong
*Assistant Examiner*—Shyue Jiunn Hwa
(74) *Attorney, Agent, or Firm*—Herman Rodriguez; Dillon & Yudell LLP (57) ABSTRACT

An analysis tool for specifically identifying the cause and location of critical memory leaks within a large software system is provided. The analysis tool transparently adds multiple processing threads that collaborate to identify sources of potential memory leaks in the software being analyzed. These threads provide notifications of object classes executing in the software that have had excessive instance counts or have exceeded the average lifetime of an object. A stack walkback is performed on objects being monitored as an out-of-memory condition approaches and while there is still sufficient memory available to unwind and store the stack walkback. By saving the stack walkbacks just prior to the out-of-memory failure, the analysis tool operator is thereby provided sufficient information to make a final determination of objects that are possible candidates for memory leaks and subsequently modify the software to reduce or eliminate the memory leaks.

21 Claims, 11 Drawing Sheets

METHOD, SYSTEM AND ARTICLE FOR DETECTING CRITICAL MEMORY LEAKS CAUSING OUT-OF-MEMORY ERRORS IN JAVA SOFTWARE

CROSS-REFERENCE TO RELATED APPLICATIONS

The present application is related to co-pending U.S. patent application Ser. No. 10/798,916, entitled "METHOD, SYSTEM AND ARTICLE FOR DETECTING MEMORY LEAKS IN JAVA SOFTWARE", filed on Mar. 11, 2004, and incorporated herein by reference in its entirety.

TECHNICAL FIELD

The present invention relates in general to computer processing systems and processes thereof. The present invention is related in particular to continuous operation performance in Java software, and still more particularly to detecting memory leaks in Java software.

BACKGROUND

The complexity of memory management in software systems continues to grow. Modern languages, such as the Java programming language developed by Sun Microsystems, Inc., eliminate some of the burden of memory management by offering automatic "garbage collection" functionality. In languages having garbage collection, a garbage collector object periodically frees all the objects that are no longer needed or can no longer be "reached" by the running program. Ideally, garbage collection will clean up all objects that are no longer needed by the program. Unfortunately, the garbage collector may not free a temporary object, which is created for an operation and then released by its creating object, because another object has created an unknown reference to the temporary object. Because the program is not aware of this unknown reference, it will fail to set this reference to null at the end of the operation. As a result, the garbage collector will not reclaim this temporary object after the operation has finished. This failure to garbage collect objects that are no longer needed results in memory management inefficiencies because the system must continue maintaining created memory for the object, instead of re-allocating the memory space to other objects needing memory resources.

This memory management problem is commonly referred to as a "memory leak." A memory leak is caused when an object cannot be collected or freed (such that its memory space becomes available for other purposes) because another object is still referring to the object, even though a software program no longer needs the object. As the number of memory leaks increases, the software program may unexpectedly run out of memory after performing a number of operations.

Memory leaks can be difficult to eliminate, because the complexity of most programs prevents manually verifying the validity of every reference. Even after a memory leak has been identified, further analysis will usually be required in order to fully understand the cause and determine the most effective solution to the memory leak. For example, true memory leaks must be distinguished from artifacts like cached objects, which are intentionally retained.

Accordingly, it would be desirable to provide methods for identifying and eliminating memory leaks in Java programs. Methods that could detect memory leaks during Java program execution would be particularly advantageous in continuous-operation applications such as in Web Application Servers (for example, the WebSphere product by International Business Machines Corporation), and in high-reliability environments such as telecommunications applications, where it is particularly hard to detect, isolate and remedy memory leaks.

SUMMARY OF THE INVENTION

In accordance with the present invention, improved methods, for detecting memory leaks in a software program are disclosed. One preferred method of the present invention provides a process thread for monitoring an amount of available memory for a software program referencing software objects. The process thread determines when the amount of available memory for the software program referencing software objects is within a predetermined threshold amount of memory within zero memory available for the software program utilizing software objects. Thereafter, upon such determination, the process thread stores a current stack walkback of currently referenced software objects prior to when the amount of available memory for the software program referencing software objects drops below an amount of available memory necessary to store the current stack walkback All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

The present invention is directed to methods for specifically identifying the cause and location of object memory leaks within a large software system. An analysis tool generates notifications of objects that have had excessive instance counts or have exceeded the average lifetime of an object, thereby providing the analysis tool operator sufficient information to make a final determination of objects that are possible candidates for memory leaks. In a preferred embodiment, a partial stack walkback is performed on objects being monitored as an out-of-memory condition approaches, but while there is still sufficient memory available to unwind and store the stack walkbacks. By saving the stack walkbacks just prior to the out-of-memory failure, the analysis tool operator can then review the stack walkbacks to identify the possible memory leak candidates that may have caused the out-of-memory condition.

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a Java software system, it will be appreciated that the present invention is not limited to Java implementations.

Figure 1:
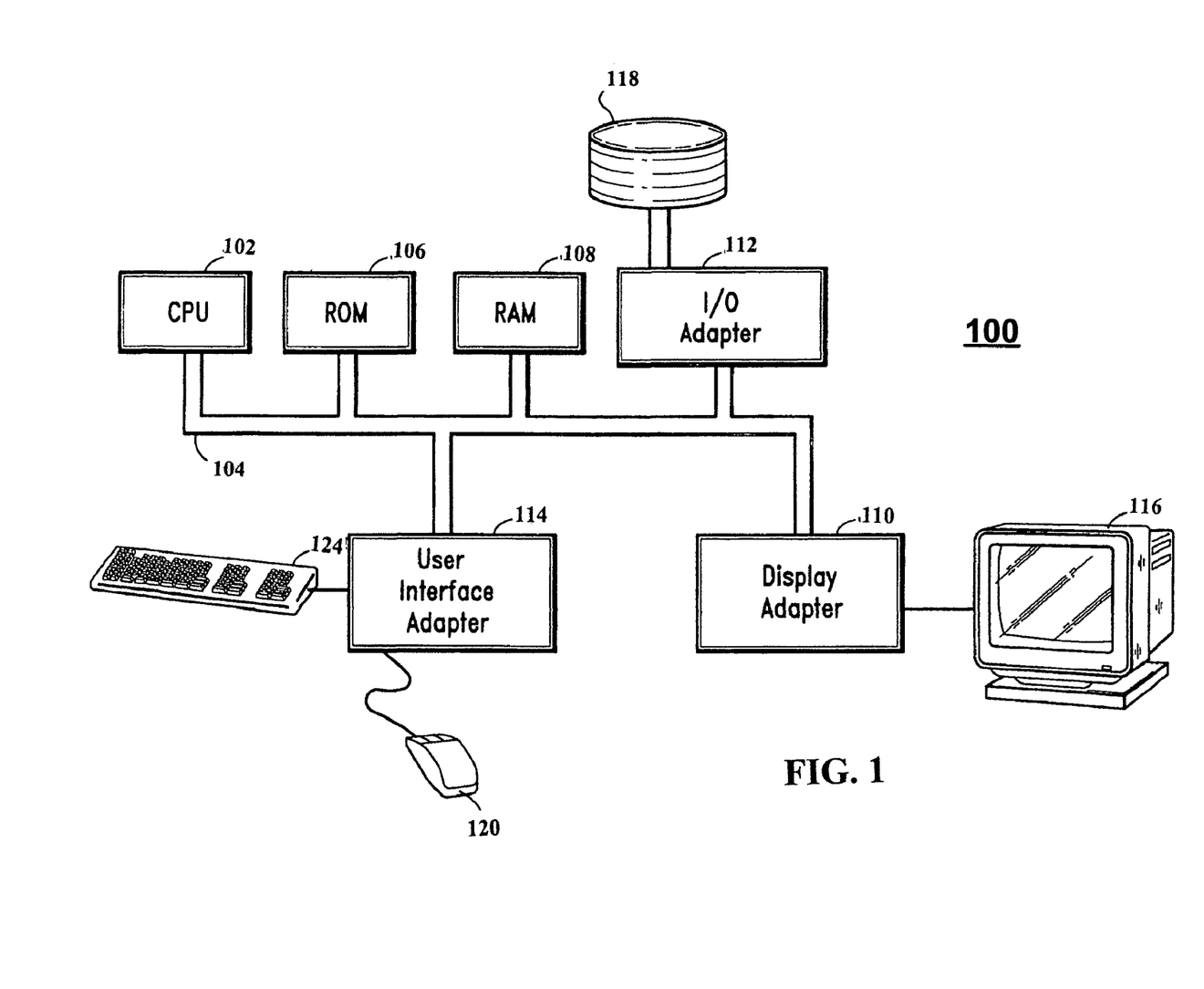
FIG. 1 depicts a block diagram of a general-purpose computer system to which the present invention may be applied.

FIG. 1 is a block diagram of a general-purpose computer system 100 to which the present invention may be applied. The computer system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are coupled to system bus 104.

Figure 2:
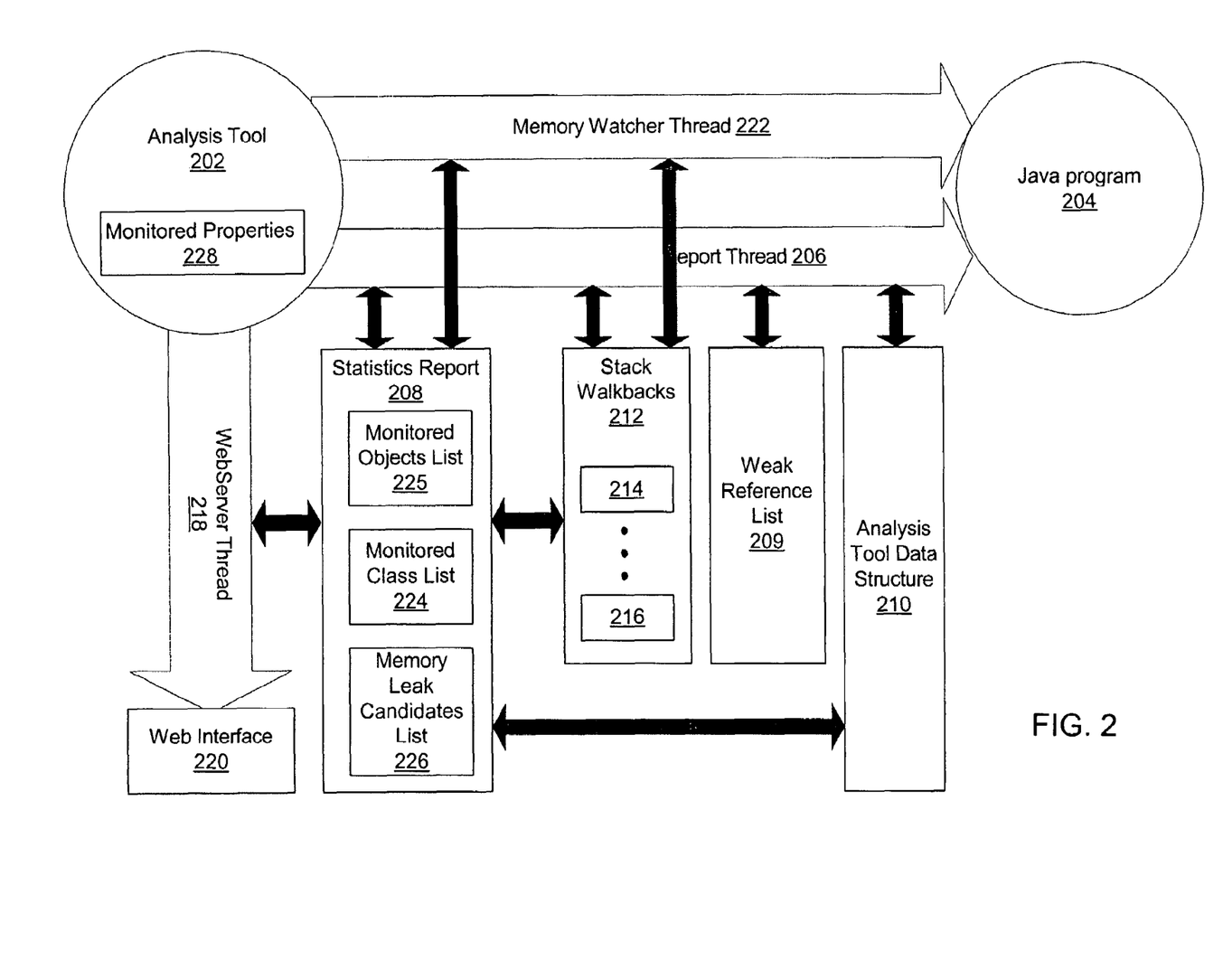
FIG. 2 depicts a block diagram of the software environment executing in computer system, in accordance with a preferred embodiment of the present invention.

Display adapter 110 operatively couples a display device 116 to system bus 104. A disk storage device (e.g., a magnetic or optical disk storage device) 118 is operatively coupled to system bus 104 by I/O adapter 112. User interface adapter 114 operatively couples a mouse 120 and keyboard 124 to system bus 104. One or more objects (not shown) are created when an Object-Oriented Program (not shown) is executed in computer system 100. In a preferred embodiment, computer system 100 executes Java software objects 202, 204 (as seen in FIG. 2).

Java is a robust, portable object-oriented programming language developed by Sun Microsystems, Inc., and which is gaining wide acceptance for writing code for the Internet and World Wide Web (hereinafter, "Web"). Java attains its portability through use of a specially designed virtual machine. This virtual machine is also referred to as a "Java Virtual Machine", or "JVM". The virtual machine isolates the details of the underlying hardware from the compiler used to compile the Java programming instructions. Those details are supplied by the implementation of the virtual machine on the targeted hardware, and include such specifics as whether little Endian or big Endian data format is used by the machine running the Java program. Because these machine-dependent details are not reflected in the compiled code, the code can be transported to a different environment (a different hardware machine, a different operating system, etc.), and executed in that environment without requiring the code to be changed or recompiled—hence the phrase "write once, run anywhere". The compiled code, referred to as Java "byte code", then runs on top of a JVM, where the JVM is tailored to that specific operating environment.

Java program source code typically consists of a set of classes stored in a series of class files. After the classes are compiled into Java bytecodes, they are then typically loaded into memory by a class loader for interpretation by a JVM interpreter before the associated program is executed. Class loading can also occur when a Java program dynamically attempts to load another class at run time.

Java applications are typically executed from a development toolkit such as the "JDK" (Java Development Kit) product from Sun Microsystems, or using the "JRE" (Java Runtime Environment) product, also from Sun Microsystems. The JRE is a subset of the JDK, providing the functionality that is required for program execution. Programs are executed from the command line when using the JRE. The Java runtime environment includes the JVM, as well as a number of files and classes that are required to run Java program or applets.

FIG. 2 shows a block diagram of the software environment executing in computer system 100, in accordance with a preferred embodiment of the present invention. To implement certain aspects of the preferred embodiment, a Java archive (JAR) is employed to implement an Analysis Tool 202, as seen in FIG. 2. Analysis Tool 202 is a Java program for detecting and analyzing object memory leaks in Java. A "memory leak" refers to a first software object that cannot be garbage collected because a second software object is unnecessarily referring to the first software object (through a "reference"). A "reference" is a mechanism for allowing one software object to call another.

Java Program 204 shown in FIG. 2 is a Java program being analyzed for memory leaks by Analysis Tool 202. For instance, a developer of Java Program 204 may want to run Analysis Tool 202 on the Java Program 204 to improve its performance in continuous operation applications by detecting and then designing-out memory leaks. Analysis Tool 202 implements a set of measures that can be applied to a large system without significant performance degradation, and so can be run against a large production system having continuous operation over a long period of time without impact to the operation of the system, while collecting the necessary information to isolate the memory leaks. In one example, Analysis Tool 202 has particular application in detecting memory leaks in the WebSphere® Business Integrator Enterprise Application Product by International Business Machines Corporation.

In accordance with a preferred embodiment, Analysis Tool 202 is implemented using multiple processing threads that continuously execute in the system. As seen in FIG. 2, a first thread is a Report Thread 206 that monitors various statistics about the Java Program 204 executing in the system, and periodically outputs a statistics report 208. Report Thread 206 runs in the background as a daemon thread, without executing primary logic, unobtrusively collecting statistics about object leak properties being monitored by Analysis Tool 202. In particular, Report Thread 206 monitors object ages and the growth in the object instance count (i.e., the increase in number of instances). Report Thread 206 maintains an analysis tool data structure 210 for storing specified analysis data, including the object leak properties of "object age" and "object instance count," collected from monitoring specified objects executing in Java Program 204 (monitored object list 225). Report Thread 206 also stores a list of classes within which the object instances are monitored (monitored class list 224), and a list of objects that are possible candidates for memory leaks (memory leak candidate list 226) within statistics report 208. Additionally, Report Thread 206 collects the stack walkbacks 214 for the monitored object instances in monitored object list 225. As is known by those skilled in the art, a stack walkback (also known as a Java stack trace) is a user-friendly snapshot of "threads" and "monitors" executing in a JVM. A stack walkback is used to track the history of an object instance to determine the point it was created.

A second processing thread implemented by Analysis Tool 202 is the WebServer thread 218, which provides a web browser interface 220 (or some other user interface) through which the operation of Analysis Tool 202 may be controlled. The WebServer thread 218 implements transactions using a standard communications protocol such as Hypertext Transfer Protocol (HTTP), which is a known application protocol providing users access to files (e.g., text, graphics, images, sound, video, etc.), and generates a Web interface 220 (e.g., a web browser) implemented using a standard page description language such as Hypertext Markup Language (HTML). This web browser interface 220 allows for selected information to be collected for objects of particular interest to the analysis tool user, such as a "watchlist" set of objects.

In a preferred embodiment, a third processing thread implemented by Analysis Tool 202 is the Memory Watcher Thread 222, which performs additional special processing for detecting critical memory leaks that may cause the system to run out of memory. The Memory Watcher Thread 222 is enabled by an extended class for the Java-standard OutOfMemoryException object (not shown), which is a "throwable" object that is created when the system is out of memory. The Memory Watcher Thread 222 of the preferred embodiment sends specified stack walkback information related to stack walkbacks 212 to statistics report 208 before an out-of-memory error occurs, and in a format that indicates the location of executing logic at the time of the out-of-memory error. This feature of the preferred embodiment permits the analysis tool operator to identify executing software that produces critical memory leaks significant enough to cause the system to run out of memory. Normally, there is insufficient allocatable memory remaining to perform a stack walkback at the point the system runs out of memory. In the preferred embodiment, before the out-of-memory error occurs, the periodic statistics report 208 is generated by Report Thread 206, and the stack walkbacks 216 are generated by the Memory Watcher Thread 222, which together identifies the likely location of the critical memory leaks within the Java Program 204 causing the out-of-memory conditions.

Analysis Tool 202 is instantiated by extending the java.lang.Object class (not shown) called by Java Program 204, which is the base class of all objects in the system and is part of the Java language package for the Java language basic objects within the JDK JVM. Analysis Tool 202 collects statistics about all objects by intercepting the processing of the default constructor of the java.lang.Object class. In order to avoid recursively entering the default constructor, semaphore logic is implemented within Analysis Tool 202. This logic also ensures that statistics are not collected on the Analysis Tool 202 itself. Analysis Tool 202 is then placed at the beginning of the Boot Classpath (not shown), enabling the java.lang.Object class to be replaced. For example, this replacement may be implemented by placing the following at the beginning of Java Program 204:

Java -bootclasspath/p:ObjectLeakDetect.jar.

"-Xbootclasspath" is the default classpath that is used by the system when the JVM boots. The JVM enables adding classes to the beginning or the end of the search path for classes (known as the "bootclasspath").

Once Analysis Tool 202 is loaded through the Boot Classpath, the analysis tool user sets specific monitoring criteria within the system properties 228 of Analysis Tool 202 that specify thresholds of the object leak properties being monitored for each object. These system properties 228 configured to implement the operation of Analysis Tool 202 are as follows:

ObjectLeakDetectFrequency: the frequency at which the daemon thread outputs statistics reports.

ObjectLeakDetectDaemonFrequency: the frequency at which the daemon thread determines how much system memory remains. This determination is used to trigger the output of additional information as available memory approaches zero.

ObjectLeakDetectAgeLimit: the object age limit at which additional reporting and analysis is triggered.

ObjectLeakDetectReferenceCountGrowth: the multiple of growth in an object's instance count at which additional reporting and analysis is triggered.

ObjectLeakDetectClassPrefix: the prefix of class names to be monitored.

ObjectLeakDetectClassPostFix: the postfix of class names to be monitored.

After initialization of Analysis Tool 202, Report Thread 206 begins monitoring the object leak properties of "object age" and "object instance count" for each object monitored class list 224. Report Thread 206 maintains the "object age" and "object instance count" object leak properties in the analysis tool data structure 210 for each executing class that meets the ObjectLeakDetectAgeLimit and ObjectLeakDetectReferenceCountGrowth monitoring criteria during execution of Java Program 204. When enabled by the web browser interface 220 via the WebServer thread 218, Report Thread 206 can collect additional information on certain object classes as specified by the user.

Figure 3:
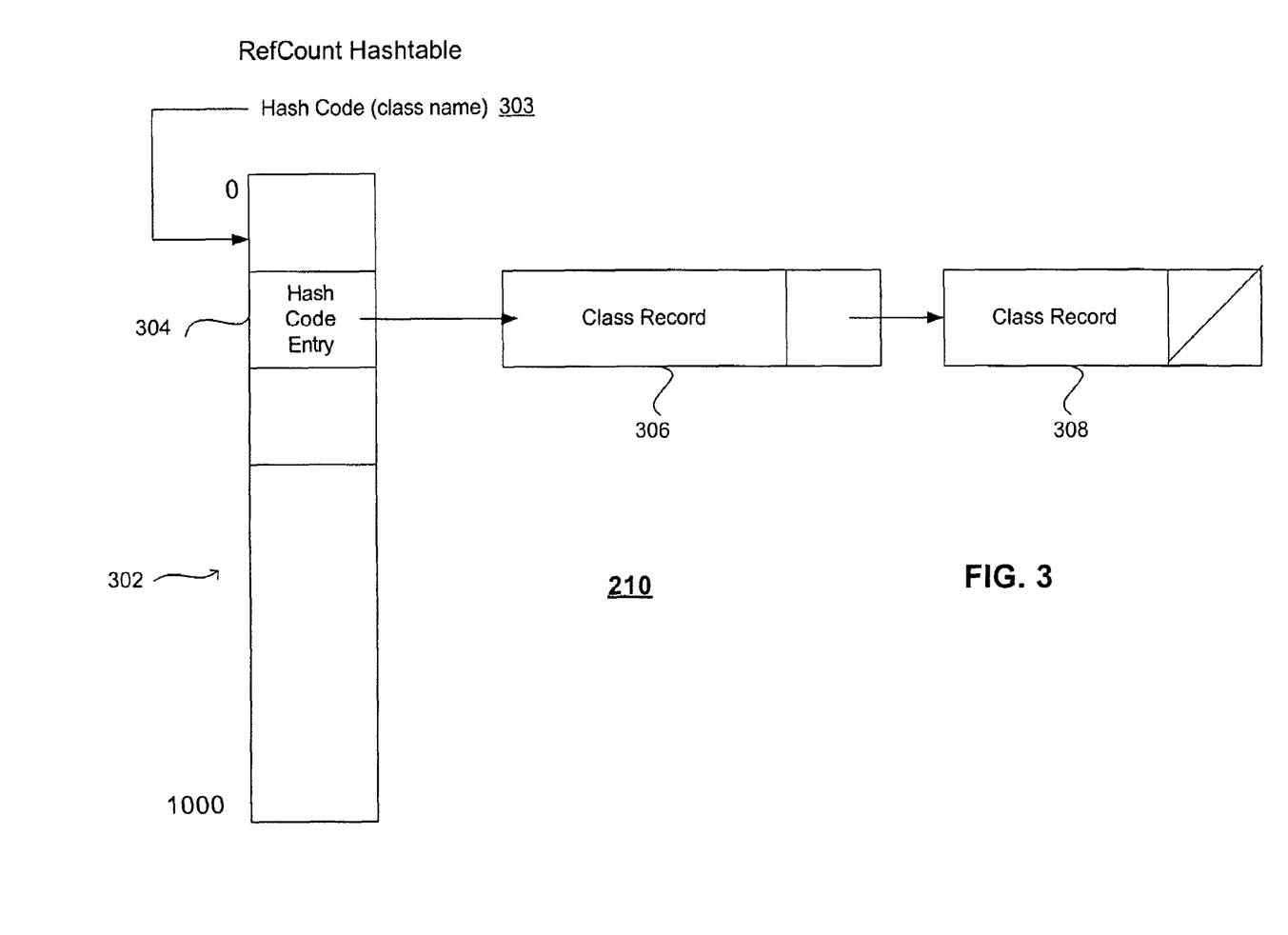
FIG. 3 illustrates an exemplary linked list embodiment of the analysis tool data structure of FIG. 2, in accordance with a preferred embodiment of the present invention.

FIG. 3 illustrates an exemplary linked list embodiment of the analysis tool data structure 210 of FIG. 2. The analysis tool data structure 210 is accessed using hashtable 302, which is indexed using the hash code 303 calculated from the class name of the object instance. This hash code 303 is an index into a linked list 306, 308 of analysis tool data structure 210, where each class record 306, 308 in the analysis tool data structure 210 represents a particular class. For example, hash code entry 304 in hashtable 302 indexes to class record 306 within analysis tool data structure 210, which in turn is linked to class record 308 within analysis tool data structure 210, thereby forming a linked list.

Figure 4:
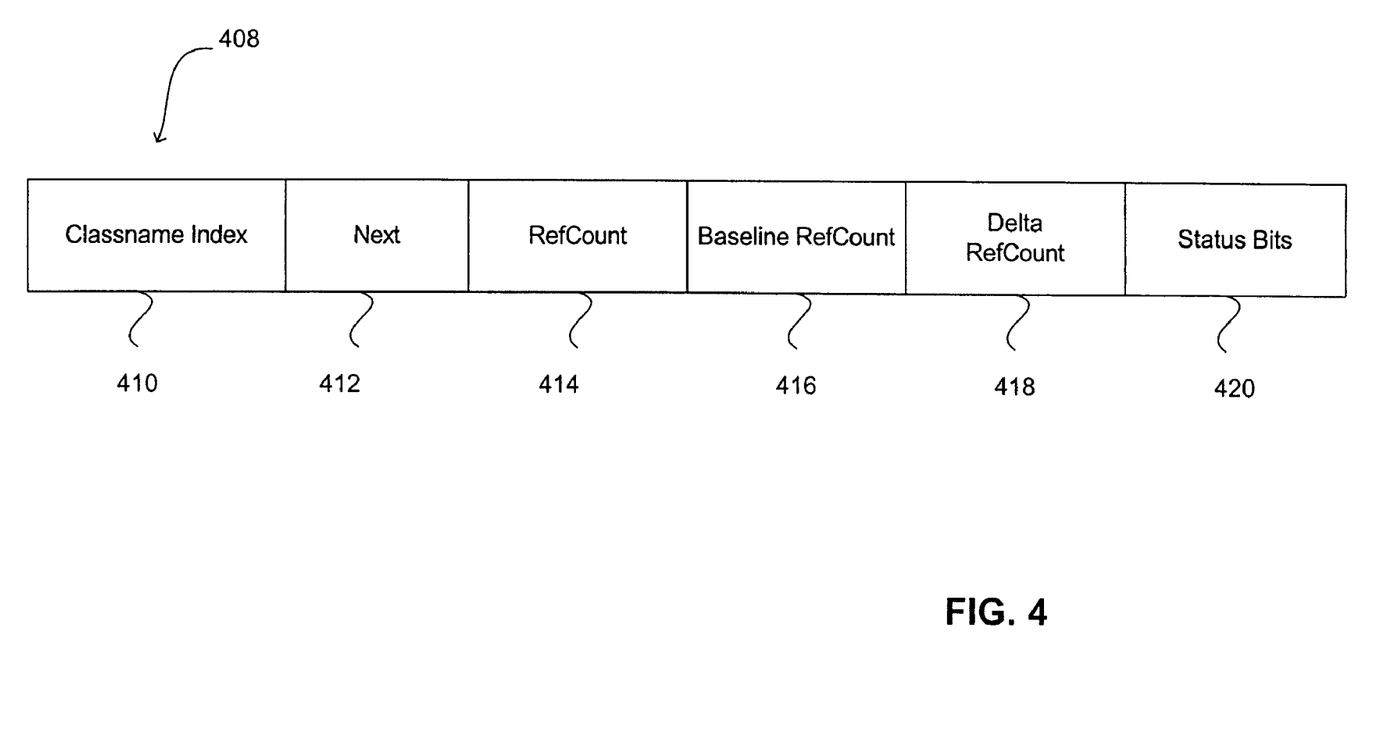
FIG. 4 depicts an example of an analysis tool data structure entry format, in accordance with a preferred embodiment of the present invention.

FIG. 4 is a more detailed view of class records 306, 308 within the analysis tool data structure 210. Class records 408 each include an index to the class name (Classname Index 410), a link to the next record (Next 412), the current instance count of objects of that class (RefCount 414) (i.e., the number of currently active objects that have not been garbage collected), the baseline instance count (Baseline RefCount 416) (i.e., the instance count at a point in time near the beginning of the analysis phase, where the system has been initialized and run for a warm-up period of time), the delta instance count (Delta RefCount 418) (i.e., the instance count change since the baseline instance count), and the Status Bits 420 indicating the aging and growth factor of the object class.

Figure 5A:
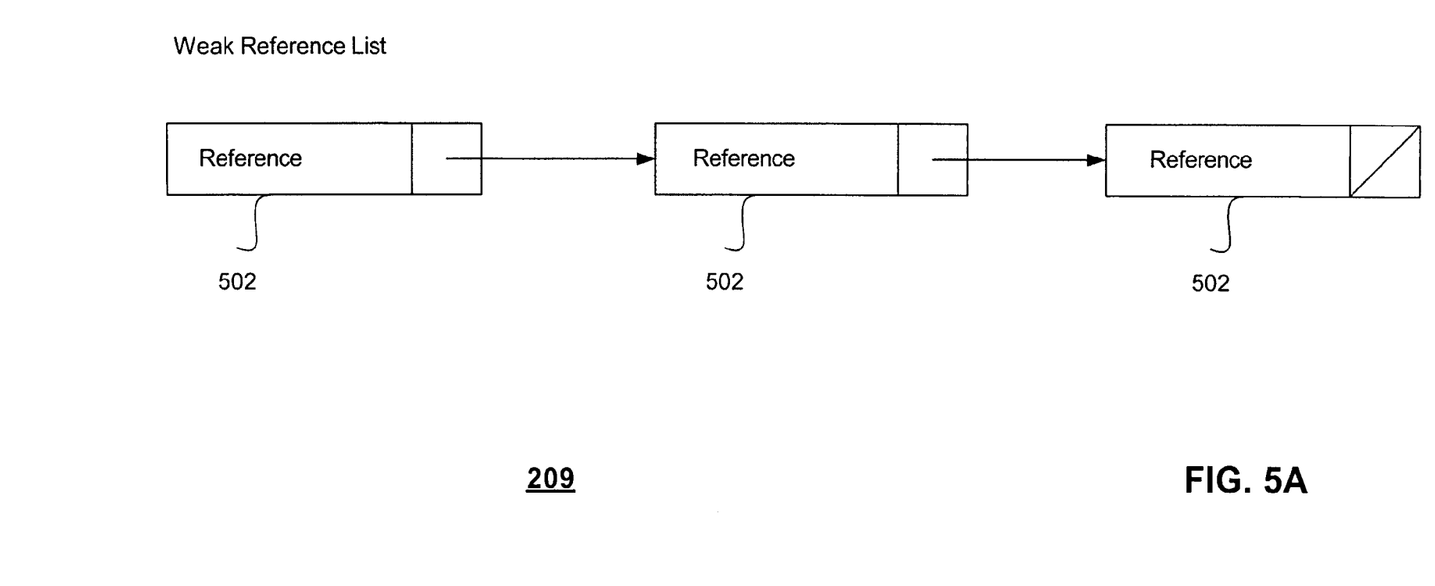
FIGS. 5A and 5B depicts an example of a weak reference list and a weak reference list entry format, respectively, in accordance with a preferred embodiment of the present invention.

FIG. 5A is a more detailed view of weak reference list 209 (see FIG. 2) as used in a preferred embodiment of the present invention. Analysis Tool 202 creates a "weak" reference (for example, reference 502) referencing a monitored object instance, and stores it in the weak reference list 209. When the monitored object instance is garbage collected, the weak reference object 502 is nulled. This indicates to Analysis Tool 202 that the monitored object instance has been collected. As is understood by those skilled in the art, a weak reference will not prevent garbage collection, but provides the necessary notification that the object has been garbage collected. When an object is garbage collected, the garbage collector clears any reference 502 to that object within the weak reference list 209. This enables Analysis Tool 202 to periodically scan the weak reference list 209 and remove items that have been garbage collected by determining if the monitored object instance's reference 502 is null.

Figure 5B:
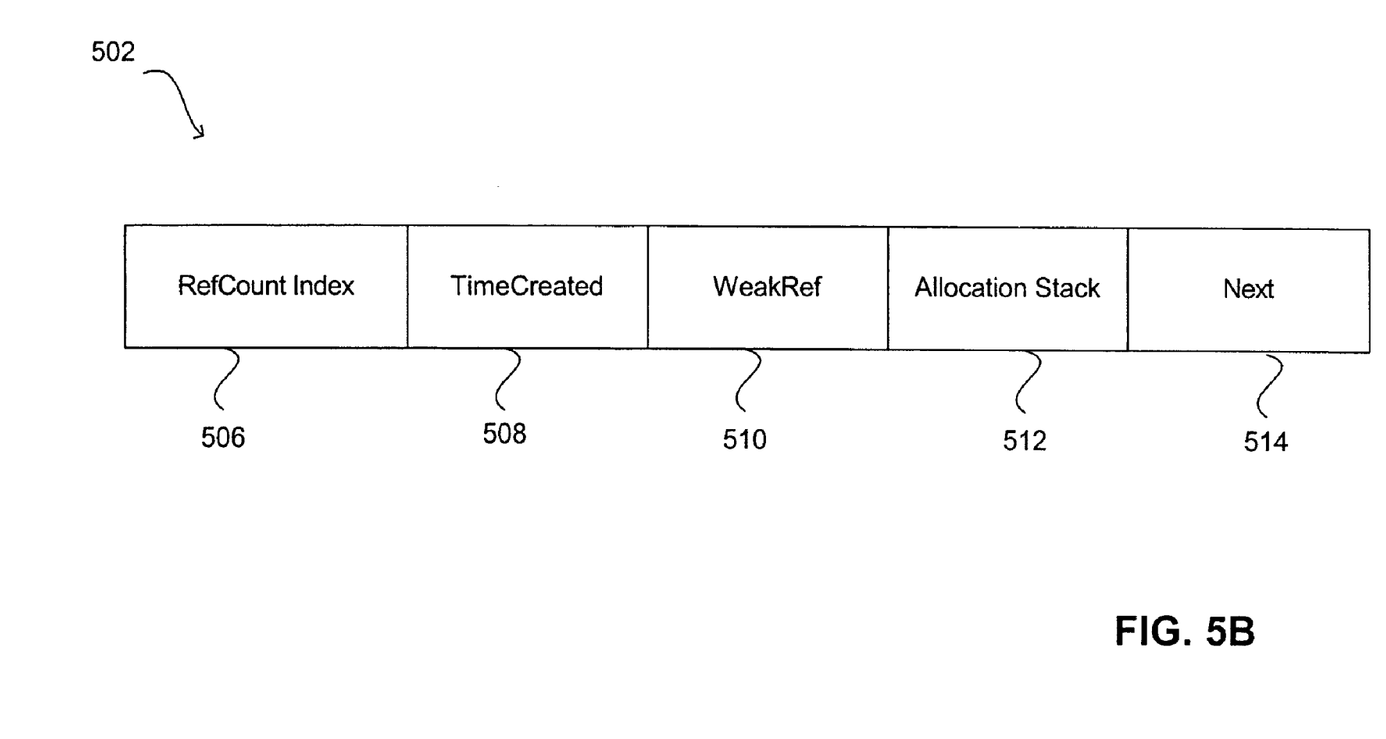

FIG. 5B shows the data structure format for a reference 502 in the weak reference list 209, in accordance with a preferred embodiment of the present invention. Reference 502 includes an instance count index (RefCount Index 506), which is a link back to the associated class record 408 within the analysis tool data structure 210 for the referenced object (this provides an easy linkage between the data of a class). Reference 502 includes a time created field (TimeCreated 508), which assists in determining the age of the object, a weak reference (WeakRef 510), which provides a weak reference relationship between the reference 502 and the associated object instance, and an Allocation Stack field 512, which refers back to the stack walkback 214 (see FIG. 2), which indicates where the object was created (if available). Last, reference 502 includes a Next field 514, which indicates the next entry in the linked weak reference list 209.

Referring back now to FIG. 2, Report Thread 206 periodically produces a statistics report 208 for the monitored set of object instances belonging to the Java classes listed in monitored class list 224, in accordance with the frequency specified by ObjectLeakDetectFrequency. The statistics report 208 documents particular statistics generated from the monitoring of Java Program 204 for those object instances of the monitored classes in monitored class list 224 that exceed the thresholds of Analysis Tool 202 monitored system properties 228 (i.e., each class that meets the ObjectLeakDetectAge-Limit and ObjectLeakDetectReferenceCountGrowth monitoring criteria during execution of Java Program 204). As part of generating the statistics report 208, Report Thread 206 measures the difference between the current instance count 414 for a given class in monitored class list 224 and the instance count 414 shown for the class the first time the class was included in a statistics report 208, thereby generating a baseline change or "delta" statistic (DeltaRefCountSinceFirst) that represents the total change in instance counts since the class was first reported. A sample of a statistics report 208 as produced in a preferred embodiment of the present invention is as follows:

| Hash Index | RefCount | DeltaRefCount (DRC) | DRC SinceFirst | Growth/Age | ClassName |
|---|---|---|---|---|---|
| 14 | 0 | 0 | 0 | | java.util.Hashtable$Enumerator |
| 15 | 0 | 0 | 0 | | java.text.DecimalFormatSymbols |
| 75 | 22 | 22 | 0 | | sun.misc.URLClassPath$JarLoader |
| 82 | 2 | 2 | 0 | | java.net.InetAddress$CacheEntry |
| 123 | 8000 | 20 | 7980 | *A | Leak |
| 134 | 0 | 0 | 0 | | java.lang.ClassNotFoundException |
| 138 | 1 | 1 | 0 | | sun.misc.Launcher$ExtClassLoader |
| 138 | 3 | 3 | 0 | | sun.net.www.protocol.jar.Handler |
| 138 | 1 | 1 | 0 | | sun.misc.Launcher$AppClassLoader |

For each monitored class in monitored class list 224, statistics report 208 shows the hash index 303, the current instance count 414, the delta instance count 418, the DeltaRefCountSinceFirst statistic, and a growth factor and age indicator (this indicator provides a visual warning to the user that (1) the class has exceeded a predetermined age limit, and/or (2) the instance count for the class has grown in excess of a predetermined growth rate since the class instance count was initially reported), and the name of the class. Classes that have current instances of objects that are older than the age limit specified in the system properties 228 (i.e., ObjectLeakDetectAgeLimit) are marked with a particular notation (an "A" as indicated in the sample above) within the statistics report 208 indicating that such objects have been instantiated (or "alive") for a relatively long time. In a preferred embodiment, the statistics report 208 further provides a notation on classes that have instance counts that have grown by a factor of ten (10) or more since they were first reported within a statistics report (as seen in the above sample, classes are marked with "*" indicating that the growth factor of that class has grown since the baseline report). These age limit and growth factor warnings are viewed in the statistics report 208 as "leak indicators," and are used by the tool operator to identify a class that has a high probability of causing a memory leak. This probability is particularly high in cases where both growth and age leak indicators are specified for a particular object (as is the case in the sample above).

Once Analysis Tool 202 identifies a small set of objects as possible leaking objects based on the leak indicators in the statistics report (i.e., the "*" and "A" identifiers), WebServer thread 218 channels an additional level of statistics to the web browser interface 220 for those objects identified by Analysis Tool 202. This additional level of statistics includes all the unique stack walkbacks 214 from among stack walkbacks 212 for the identified set of objects to determine the origin of these objects (i.e., where they where created). Periodically, these unique stack walkbacks 214 are downloaded into the web interface 220, so that the analysis tool operator can see where each of the identified possible leak candidates 226 was created.

A description of the various methods for detecting object memory leaks in Java software implemented by Java processing threads 206, 218, 222 in accordance with a preferred embodiment of the present invention will now be given with reference to FIGS. 6-10. In particular, with reference to FIG.

Figure 6:
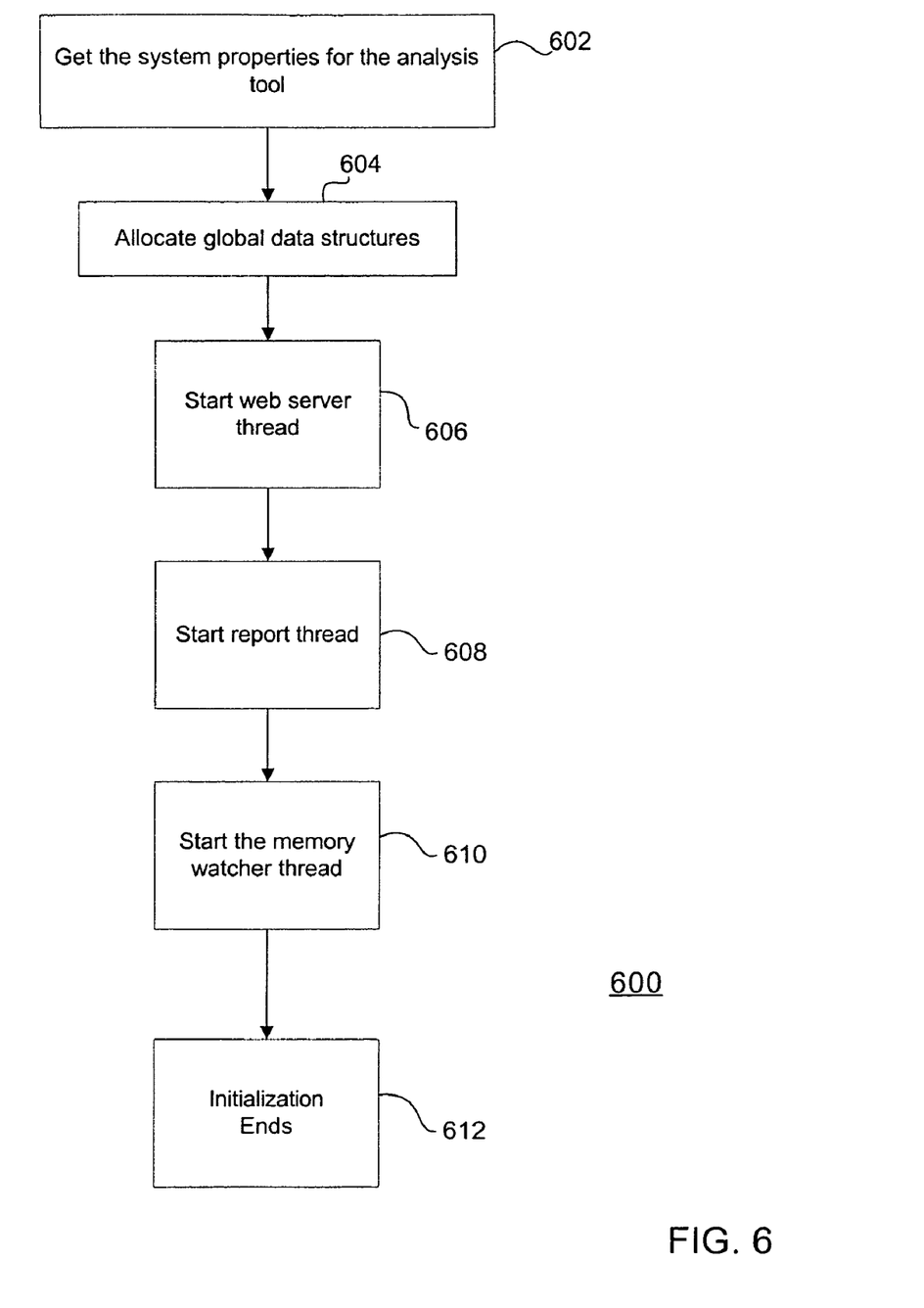
FIG. 6 depicts flow diagram of a process for initializing the processing threads of ObjectLeakDetect.jar, in accordance with a preferred embodiment of the present invention.

6, there is shown a flow diagram of a process for initializing the processing threads of Analysis Tool 202, in accordance with a preferred embodiment of the present invention. The process begins at step 602, where Analysis Tool 202 retrieves the system properties 228, including the Web server port, age limits, object class, prefix/postfix patterns, thread frequencies and other information from the system using the "getProperties()" method of the java.lang.System object. At step 604, Analysis Tool 202 allocates global data structures within the system memory for use by the processing threads 206, 218, 222. These global data structures include statistics report 208, the analysis tool data structure 210, a weak reference list 209, and stack walkbacks 212, which stores the stack walkbacks generated by Analysis Tool 202 periodically during run-time. Process 600 continues at step 606, where Analysis Tool 202 starts the WebServer thread 218. At step 608, Analysis Tool 202 starts Report Thread 206. At step 610, Analysis Tool 202 starts the Memory Watcher Thread 222. Thereafter, the initialization process ends at step 612.

Figure 7:
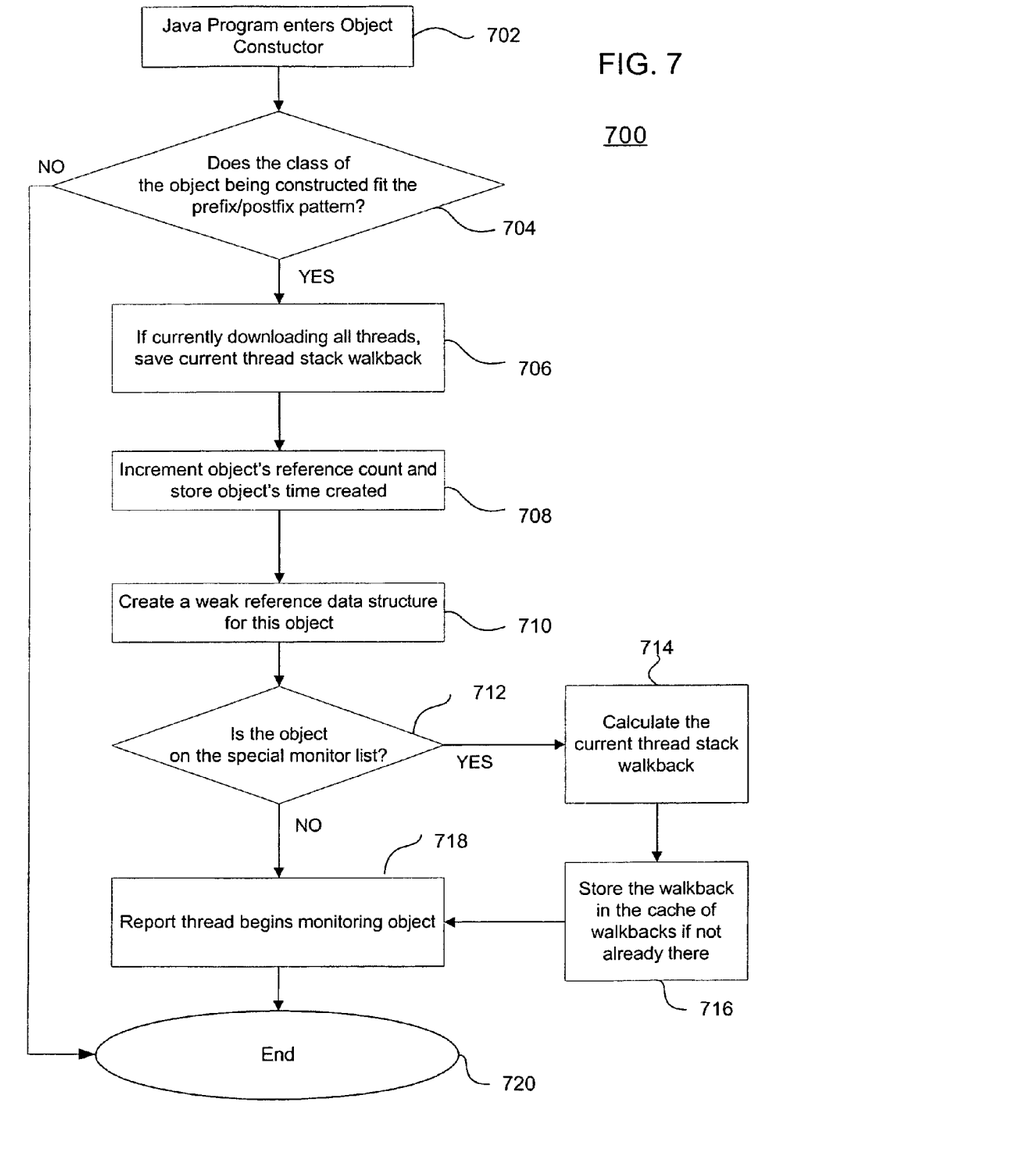
FIG. 7 depicts a flow diagram of a process for adding an object to a list of objects monitored by ObjectLeakDetect.jar, in accordance with a preferred embodiment of the present invention.

With reference now to FIG. 7, there is shown a flow diagram of a process for adding an object instance to the monitored objects list 225 of object instances monitored by Analysis Tool 202, in accordance with a preferred embodiment of the present invention. Process 700 begins at step 702 when one of a number of watcher threads (not shown) generated by Analysis Tool 202 to monitor every process thread (not shown) created by Java Program 204 during execution senses that Java Program 204 has entered an object constructor to create a new Java object. At step 704, Analysis Tool 202 determines whether the class name of the object being constructed fits the Prefix/Post-fix patterns specified by the properties 228 (i.e., ObjectLeakDetectClassPrefix and ObjectLeakDetectClassPostFix). If not, the process passes to step 720, where the process ends. If so, the process proceeds to step 706, where Analysis Tool 202 downloads the current thread stack walkback 214 for the object being created at step 702 into the statistics report 208. In a preferred embodiment, step 706 is only performed if Report Thread 206 is currently downloading all other thread stack walkbacks 212 into the statistics report 208. Thereafter, the process proceeds to step 708, where Analysis Tool 202 calculates the hash code 303 of the new object's class name and uses it to index into the analysis tool data structure 210 to increment the reference count 414 and store the time of creation 508 for the Class Record 408 having a Classname Index 410 matching the new object's class. Then, at step 710, Analysis Tool 202 creates a weak reference 502 to the new object within weak reference list 209. Thereafter, at step 712, Analysis Tool 202 determines whether the object is on a special monitor list (not shown). If so, the process proceeds to step 714, where Analysis Tool 202 calculates the current stack walkback for the new object, and then, at step 716, stores the calculated current stack walkback in Stack Walkbacks 212, if not already stored therein. If the calculated stack walkback is already contained within the Stack Walkbacks 212, it is not stored in order to save space within the cache. From step 716 and from decision block 712, process 700 proceeds to step 718, where the new object's class is added to the monitored class list 224. Thereafter, process 700 ends at step 720.

Figure 8:
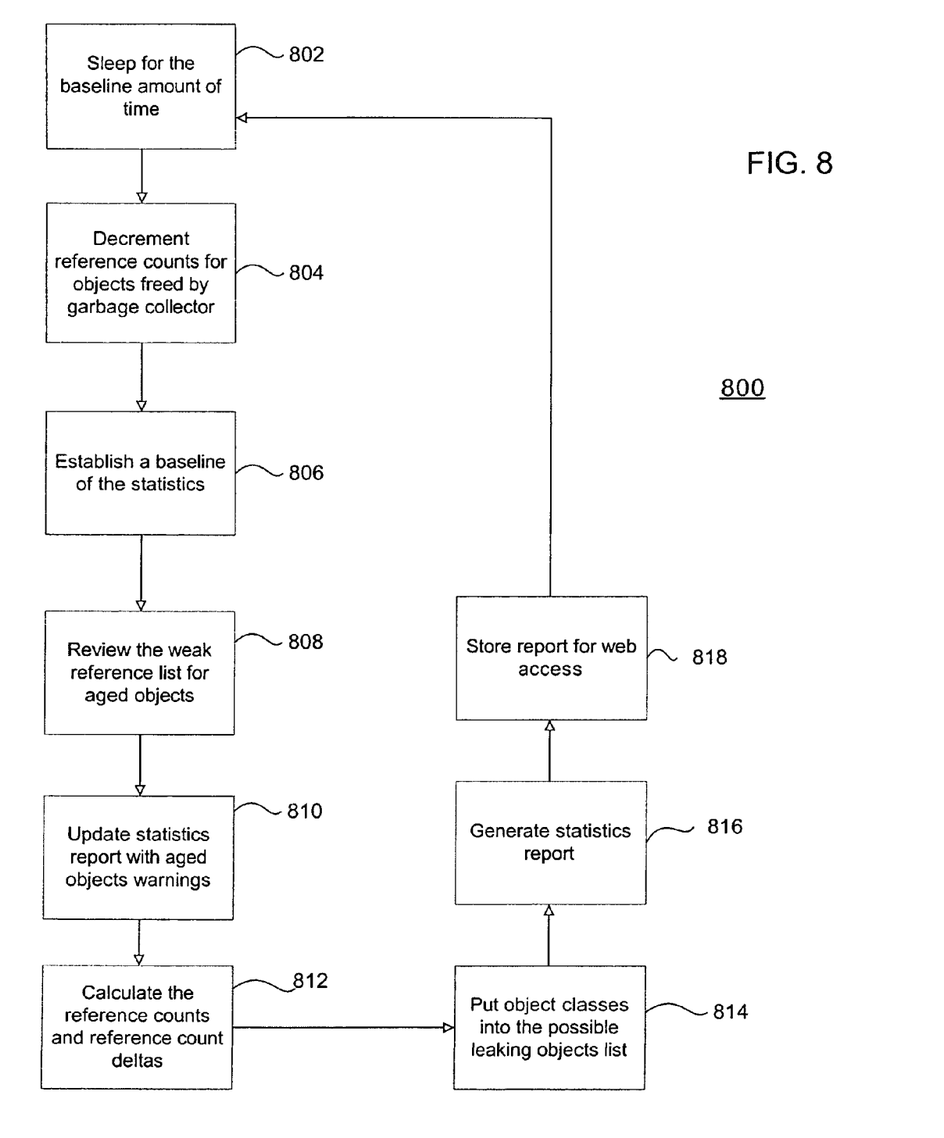
FIG. 8 depicts a flow diagram of the process for instance count analysis performed by daemon thread, in accordance with the preferred embodiment of the invention.

With reference now to FIG. 8, there is shown a flow diagram of the process for instance count analysis performed by Report Thread 206, in accordance with the preferred embodiment of the present invention. Process 800 begins at step 802, where the process 800 waits for a baseline amount of time specified by the programmer. Thereafter, the process 800 proceeds to step 804, where, upon completion of the next execution of the system garbage collection routine, Report Thread 206 accesses the weak reference list 209 to determine which objects have been freed by the garbage collection process, and then decrements the instance counts 414 for those freed objects. The process 800 then proceeds to step 806, where Report Thread 206 establishes a baseline of statistics within statistics report 208 for the objects in Java Program 204 being monitored (i.e., all object instances belonging to one of the classes in the monitored class list 224) based on the system properties 228 set during the initialization phase (step 602). At step 808, Report Thread 206 waits for completion of the next execution of the system garbage collection routine, and then reviews all objects contained within weak reference list 209 to determine if they have aged beyond the threshold specified by the ObjectLeakDetectAgeLimit property. At step 810, Report Thread 206 updates the statistics report 208 with the indications identifying aged objects. Thereafter, at step 812, Report Thread 206 calculates the delta instance counts 418, which indicate the instance count growth since step 806. At step 814, Report Thread 206 adds the object that is possibly leaking to the memory leak candidates list 226 based on those objects having aged object warnings, significant growth instance count deltas, or other warnings or information.

At step 816, Report Thread 206 generates a statistics report 208 to be sent to a standard output object, which contains memory leak candidates list 226, stack walkbacks 212, and monitored class list 224. At step 818, the statistics report 208 is stored for user access at Web interface 220 via WebServer thread 218. Thereafter, the process returns to step 802 for the next execution of process 800.

Figure 9:
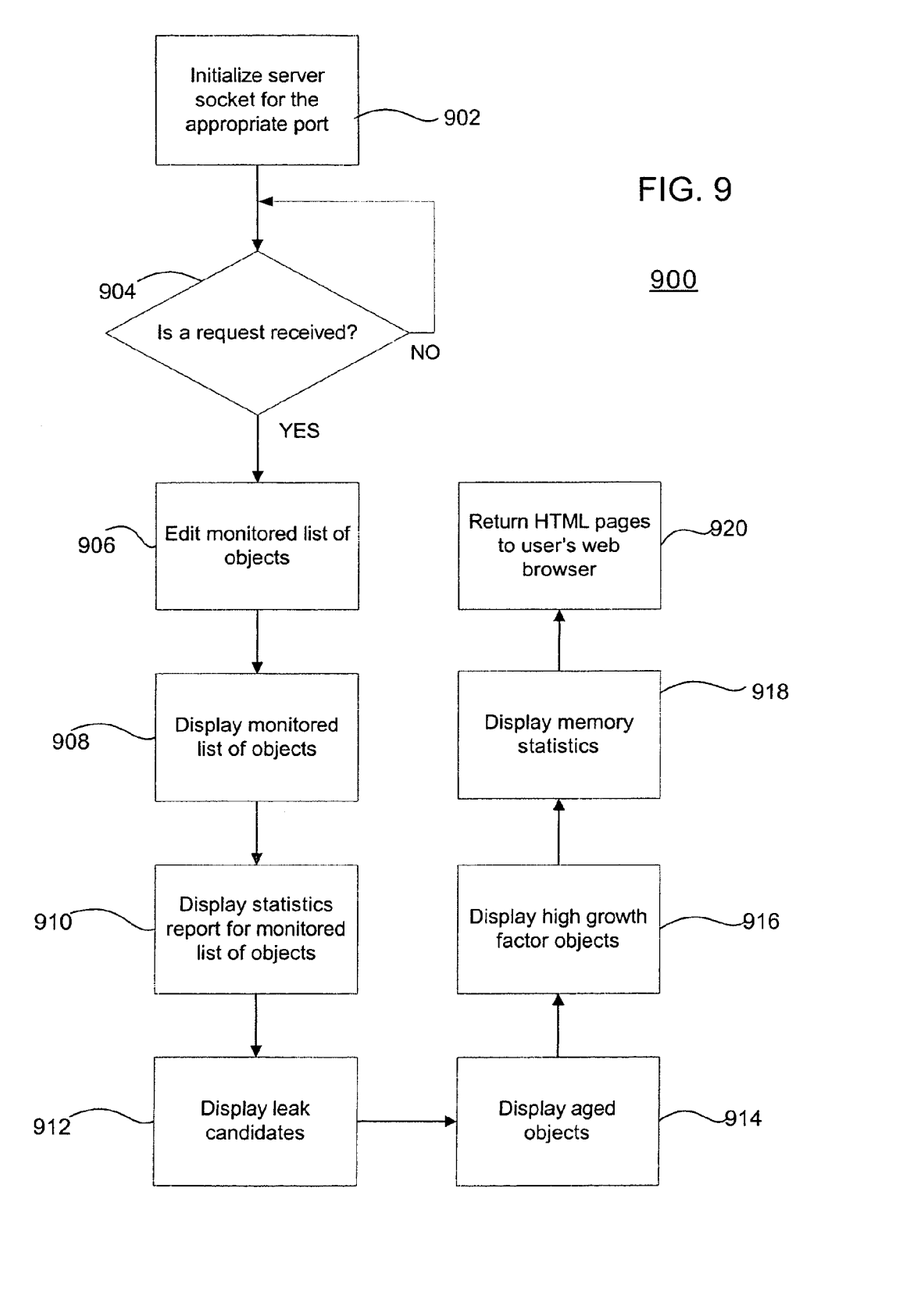
FIG. 9 depicts a flow diagram of the execution of the WebServer thread, in accordance with a preferred embodiment of the present invention.

With reference now to FIG. 9, there is shown a flow diagram of the execution of the WebServer thread 218, in accordance with a preferred embodiment of the present invention. Process 900 begins at step 902, when WebServer thread 218 initializes the server socket on the appropriate port for the Web interface 220. At decision block 904, it is determined if a request from Analysis Tool 202 operator is received to view a statistics report 208 from the current statistics of Report Thread 206. The process 900 waits at step 904 until such a request is received, and then proceeds to steps 906-920, where WebServer thread 218 presents the data in statistics report 208 to the operator.

At step 906 of process 900 shown in FIG. 9, WebServer thread 218 permits the Analysis Tool 202 operator to edit, within Web interface 220, the monitored class list 224 to only list the objects for which the operator desires to be reported. At step 908, WebServer thread 218 displays the list of classes to be included in the monitoring statistics to be output on Web interface 220 for the operator. At step 910, WebServer thread 218 displays the statistics report 208 for those objects in monitored class list 224 on Web interface 220. At step 912, WebServer thread 218 displays the memory leak candidates, as determined by Report Thread 206, on Web interface 220. At step 914, WebServer thread 218 displays the aged objects, as determined by Report Thread 206, on Web interface 220. At step 916, WebServer thread 218 displays the high growth factor objects, as determined by Report Thread 206, on Web interface 220. At step 918, WebServer thread 218 displays memory statistics indicating the percentage of memory in use by the system and the total available memory on Web interface 220. Thereafter, the process ends at step 920, when WebServer thread 218 generates HTML pages resulting from execution of steps 906-918 are returned to the operator's Web browser for analysis.

Figure 10:
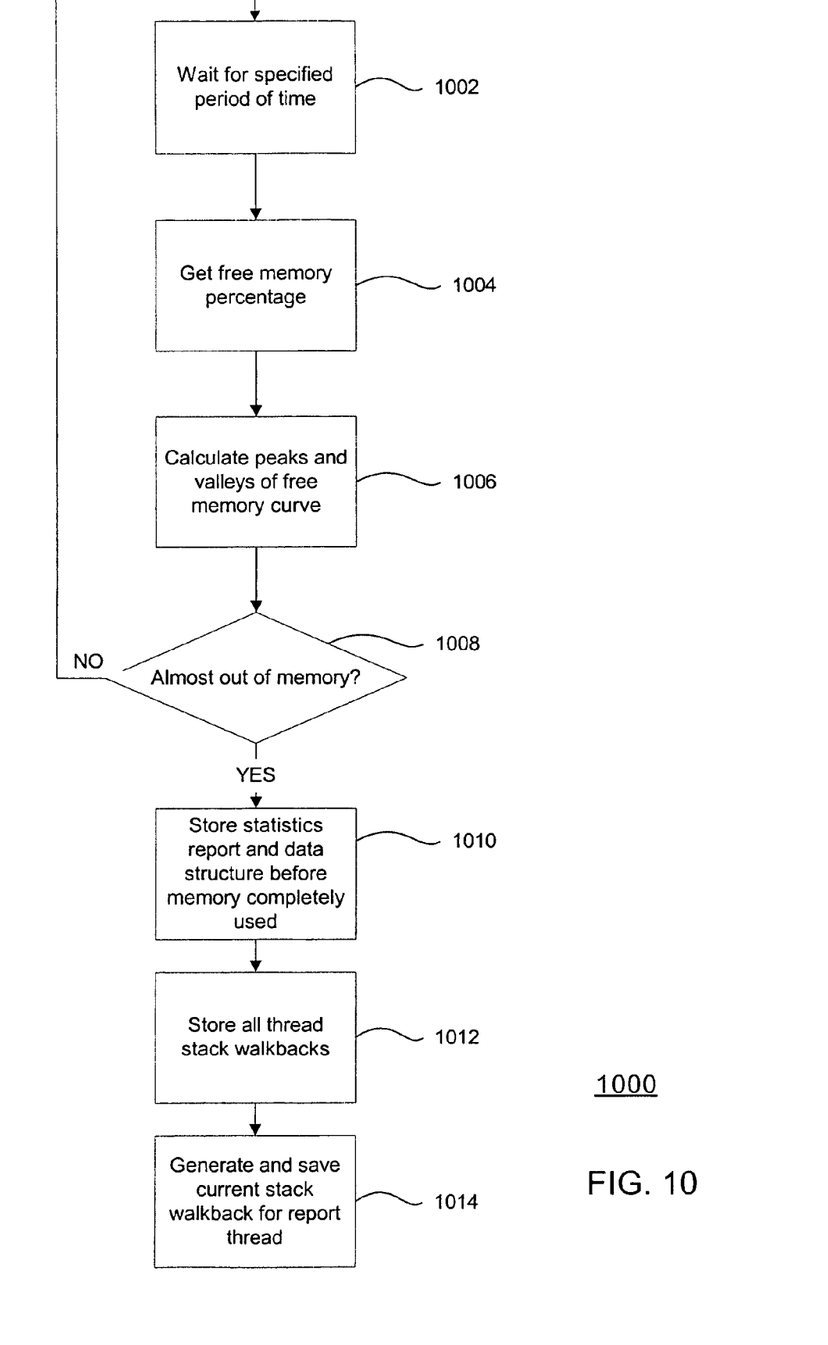
FIG. 10 depicts flow diagram of the operation of the OutOfMemory watcher thread, in accordance with a preferred embodiment of the present invention.

With reference now to FIG. 10, a flow diagram of the operation of the Memory Watcher Thread 222, in accordance with a preferred embodiment of the present invention, is depicted. Process 1000 begins at step 1002, where the Memory Watcher Thread 222 waits for a pre-selected amount of time following initialization of Analysis Tool 202 (process 700). This amount of time is specified by Analysis Tool 202 designer or can be set by the tool operator. At step 1004, Memory Watcher Thread 222 determines the percentage of free memory available to the Java Program 204 and Analysis Tool 202. At step 1006, Memory Watcher Thread 222 calculates the maximum and minimum usages of the free memory over time to determine a free memory curve describing the free memory during run time. At decision block 1008, Memory Watcher Thread 222 determines if the system is almost out of memory. If the free memory does not exceed a predetermined threshold, the process returns to step 1002, where Memory Watcher Thread 222 waits the predetermined amount of time before re-running the process 1000. If the decision at step 1008 is that the system is almost out of memory, the process proceeds to step 1010, where Memory Watcher Thread 222 stores the statistics report 208 and analysis tool data structure 210 to memory before the actual free memory is completely consumed. Thereafter, the process proceeds to 1012, where Memory Watcher Thread 222 saves stack walkbacks 212 to memory. Thereafter, at step 1014, Memory Watcher Thread 222 determines and stores to memory the current stack walkback 216 for Report Thread 206.

As will be appreciated, process 1000 stores the stack walkbacks of classes in monitored class list 224 as an out-of-memory condition is approaching, but while there is still sufficient memory available to perform the storage procedure. By saving the statistics report 208, analysis tool data structure 210 and stack walkbacks 212 just prior to the out-of-memory failure, Memory Watcher Thread 222 permits the Analysis Tool 202 operator to identify possible memory leak candidates that may have caused the out-of-memory condition.

The present invention is most efficiently applied to large software systems to identify leaks that are affecting the system stability and performance. The cumulative interaction of the various threads 206, 218, 222 of Analysis Tool 202 provide the ability to isolate the cause of memory leaks, particularly within a long running process, such as a web application server. As will be appreciated, Analysis Tool 202 provides notifications of object classes that have had abnormal instance counts or have exceeded the average lifetime of an object, thereby providing the analysis tool operator sufficient information to make a final determination of objects that are possible candidates for memory leaks, and to subsequently modify and correct the Java code to reduce or eliminate the memory leak problems. In a preferred embodiment, a single execution of Analysis Tool 202 generates a list of possible classes that are candidates for object leaks. This list of candidates is then utilizes as a filter to execute a second run of Analysis Tool 202 on the list of possible candidate classes.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, thereby making an article of manufacture in accordance with the invention. The article of manufacture containing the computer programming code is used by either executing the code directly from the storage device, by copying the code from the storage device into another storage device such as a hard disk, RAM. or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or

What is claimed is:

1. A computer-implemented method for assisting detection of critical memory leaks in a software program, the method comprising the steps of:

monitoring an amount of available memory for the software program during execution of the software program;

determining if the amount of available memory for the software program is less than a predetermined amount;

in response to such determination, storing a current stack walkback of each object currently referenced by the software program prior to the available memory dropping below an amount necessary to store the current stack walkback, wherein the current stack walkback assists in the detection of a critical memory leak during execution of the software program;

monitoring specified one or more analysis properties of the objects referenced by the software program, wherein the one or more specified analysis properties consists of at least one of an object's age and an object's instance count;

determining if any analysis property of the objects being referenced following a garbage collection process exceeds a predetermined limit for such analysis property, wherein the predetermined limit for an object's age is an object age limit and the predetermined limit for an object's instance count is an object instance count growth value;

identifying any objects determined to have one or more analysis properties that exceeds property's predetermined limit; and calculating an object's age by timing a current period starting when the respective object was instantiated.

2. The method according to claim 1, further comprising the step of calculating an object's instance count growth as magnitude of growth of an object instance count over a given time period.

3. The method according to claim 1, wherein the step of monitoring comprises monitoring objects within a class designated for monitoring.

4. The method according to claim 1, further comprising the step of performing the current stack walkbacks for the identified objects.

5. The method according to claim 4, further comprising the step of generating a statistics report including current stack walkbacks for the identified objects.

6. The method according to claim 5, further comprising the step of generating a web interface for user viewing of the statistics report at a computer display.

7. The method according to claim 1, wherein the software objects are Java objects.

8. A computer-implemented system for assisting detection of critical memory leaks in a software program comprising:
one processor;
means for monitoring an amount of available memory for the software program during execution of the software program;
means for determining if the amount of available memory for the software program is less than a predetermined amount; and
means for, in response to determination, storing a current stack walkback of each object currently referenced by the software program prior to the available memory dropping below an amount necessary to store the current stack walkback, wherein the current stack walkback assists in the defection of critical memory leak during execution of the soft-ware program;
means for monitoring specified one or more analysis properties of the objects referenced by the software program, wherein the one or more specified analysis properties consists of at least one of an object's age and an object's instance count;
means for determining if any analysis property of the objects being referenced following a garbage collection process exceeds a predetermined limit for such analysis property, wherein the predetermined limit for an object's age is an object age limit and the predetermined limit for an object's instance count is an object instance count growth value; and
means for identifying software objects determined to have one or more analysis properties that exceeds property's predetermined limit;
means for calculating an object's age by timing a current period starting when respective object was instantiated.

9. The system according to claim 8, further comprising means for calculating object instance count growth as magnitude of growth of an object's instance count over a given time period.

10. The system according to claim 8, wherein means for monitoring comprises means for monitoring objects within a class designated for monitoring.

11. The system according to claim 8, further comprising means for performing the current stack walkbacks for the identified objects.

12. The system according to claim 11, further comprising means for generating a statistics report including current stack walkbacks for the identified objects.

13. The system according to claim 12, further comprising means for generating a web interface for user viewing of the statistics report at a computer display.

14. The system according to claim 8, wherein the software objects are Java objects.

15. An article of manufacture comprising machine-readable storage medium including program logic embedded therein for assisting detection of critical memory leaks in a software program that causes control circuitry in a data processing system to perform the steps of:
monitoring an amount of available memory for the software program during execution of the software program;
determining if the amount of available memory for the software program is less than a predetermined amount; and
in response to such determination, storing a current stack walkback of each object currently referenced by the software program prior to the available memory dropping below an amount necessary to store the current stack walkback, wherein the current stack walkback assists in the detection of a critical memory leak during execution of the software program;
monitoring, specified one or more analysis properties of objects referenced by the software program, wherein the one or more specified analysis properties consists of at least one of an object's age and an object's instance count;
determining if any analysis property of the objects being referenced following a garbage collection process exceeds a predetermined limit for such analysis property, wherein the predetermined limit for an object's age is an object age limit and the predetermined limit for an object's instance count is an object instance count growth value;
identifying any objects determined to have one or more analysis properties that exceeds property's predetermined limit; and
calculating an object's age by timing a current period starting when respective object was instantiated.

16. The article of manufacture of claim 15, further comprising the step of calculating object instance count growth as magnitude of growth of an object's instance count over a given time period.

17. The article of manufacture of claim 15, wherein the step of monitoring comprises monitoring objects within a class designated for monitoring.

18. The article of manufacture of claim 15, further comprising the step of performing the current stack walkbacks for the identified objects.

19. The article of manufacture of claim 18, further comprising the step of generating a statistics report including current stack walkbacks for the identified objects.

20. The article of manufacture of claim 19, further comprises the step of generating a web interface for user viewing of the statistics report at a computer display.

21. The article of manufacture of claim 15, wherein the software objects are Java objects.

* * * * *